(12) United States Patent
Yoshida (10) Patent No.: US 6,876,811 B1
(45) Date of Patent: Apr. 5, 2005

(54) RECORDING MEDIUM REPRODUCTION APPARATUS WITH MULTIPLE REPRODUCING MODE

(75) Inventor: Shinji Yoshida, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 938 days.

(21) Appl. No.: 09/604,797

(22) Filed: Jun. 27, 2000

(30) Foreign Application Priority Data

Jun. 29, 1999 (JP) .................................. P. 11-183584

(51) Int. Cl.[7] ................................................ H04N 5/93
(52) U.S. Cl. ............................ 386/55; 386/94; 386/95
(58) Field of Search ............................ 386/52, 55, 95, 386/68, 70, 125–126, 124, 94; H04N 5/93

(56) References Cited

U.S. PATENT DOCUMENTS

| | | | | |
|---|---|---|---|---|
| 5,172,111 A | * | 12/1992 | Olivo, Jr. ................... | 386/126 |
| 5,589,945 A | * | 12/1996 | Abecassis ................... | 386/83 |
| 5,819,004 A | * | 10/1998 | Azadegan et al. .......... | 386/112 |
| 6,181,870 B1 | * | 1/2001 | Okada et al. ................ | 386/95 |

FOREIGN PATENT DOCUMENTS

JP   3-248370 A   11/1991

OTHER PUBLICATIONS

International Search Report.

* cited by examiner

Primary Examiner—Vincent Boccio
(74) Attorney, Agent, or Firm—Morgan Lewis & Bockius LLP

(57) ABSTRACT

It is checked whether a reproduction using a user lock function has been set (Step S82) and if it has been set, it is checked whether each disk is the one registered in a skip point table 3a according to disk data on the disk loaded, for example, BCA data and the total reproduction time (Step S84). If the disk is otherwise found registered, POINT # is read out and set in the work area of memory 3 (Step S86). The reproduction is also started by using the user lock function (Step S88). In other words, the skip reproduction is carried out when a reproduction point approaches the section defined by the POINT #. It is checked whether or not the remaining reproduction time is zero (Step S90) and if it is not zero, this action is repeated. If the remaining time is found zero at Step S90, the reproduction operation is terminated (Step S92) and so is the whole process.

7 Claims, 8 Drawing Sheets

| DISK # | POINT # | | TOTAL NUMBER OF SKIP POINT |
|---|---|---|---|
| | TITLE # | CHAPTER # | |
| 1 | 1 | 1  A – A'<br>2  A – A'<br>4  A – A', B – B' | 4 |
| 2 | 1 | 1  A – A'<br>3  A – A', B – B' | |
| | 3 | 5  A – A', B – B' | 5 |
| 3 | 1 | 2  A – A', B – B'<br>C – C' | 3 |
| 4 | 1 | 2  A – A'<br>4  A – A', B – B'<br>8  A – A' | 4 |
| 5 | 1 | 6  A – A' | 1 |
| 6 | 1 | 1  A – A', B – B'<br>C – C', D – D' | 4 |

| DISK # | POINT # | | TOTAL NUMBER OF SKIP POINT |
|---|---|---|---|
| | TITLE # | CHAPTER # | |
| 1 | 1 | 1 A - A'<br>2 A - A'<br>4 A - A', B - B' | 4 |
| 2 | 1<br><br>3 | 1 A - A'<br>3 A - A', B - B'<br>5 A - A', B - B' | 5 |
| 3 | 1 | 2 A - A', B - B'<br>C - C' | 3 |
| 4 | 1 | 2 A - A'<br>4 A - A', B - B'<br>8 A - A' | 4 |
| 5 | 1 | 6 A - A' | 1 |
| 6 | 1 | 1 A - A', B - B'<br>C - C', D - D' | 4 |
| | | | |

RECORDING MEDIUM REPRODUCTION APPARATUS WITH MULTIPLE REPRODUCING MODE

BACKGROUND OF THE INVENTION

The present invention relates to recording medium reproduction apparatus and more particularly to a recording medium reproduction apparatus characterized in that a skip reproduction over a designated section can be done according to the contents therein.

A still image reproduction apparatus proposed in Japanese Patent Publication No. 3-248370A aims to solve the problem of unnaturalness arising from gaining access to one recorded image that one would not like any other person to watch when a plurality of recorded still images on a tape-type recording medium reproduction medium are sequentially reproduced.

DVD (Digital Versatile Disk) players are equipped with parental locks for restricting the reproduction of scenes such as violence or sex scenes (hereinafter called adult scenes) contained in the contents and considered as those badly affecting the sound growth of infants and minors.

In that case, the control level based on the prescribed ethical standard is pre-recorded on the disk corresponding to the parental lock function by matching each scene in the contents to the ethical standard.

While the parental lock function is kept effective after the reproduction level based on the control level is set to the DVD player, only a scene wherein the control level recorded on the disk conforms to the reproduction level is reproduced when the disk is played, and any other scene is skipped. In place of the skip reproduction, an alternative scene may be reproduced by replacing any scene to be skipped with the alternative one beforehand.

More specifically, infants and minors are allowed to enjoy sound and images included in the contents at parent's ease because the use of the parental lock function makes it possible to skip any adult scene on the basis of the control level added by the contents supplier without any specific operation on the part of user.

However, the parental lock function of the DVD player will not be performable in a case where the control level is not recorded in the contents for reasons of the contents supplier's own such as cost restrictions.

Under the circumstances, parents of children are compelled to do a skip reproduction as specified when the children want to watch and hear the contents by examining the contents from beginning to end and specifying scenes to be skipped.

Therefore, the demand is for a contrivance to be developed for relieving those parents of the operational burden.

SUMMARY OF THE INVENTION

An object of the present invention made in the above circumstances is to provide a recording medium reproduction apparatus capable of an automatic skip reproduction over predetermined sections of contents without a pre-recorded control level.

In order to achieve the above object, according to the present invention, there is provided an apparatus for reproducing contents recorded on a recording medium exchangeably loaded therein in a predetermined order and for reproducing the same skippingly regardless the predetermined order, the apparatus comprising:

a discriminator for discriminating the contents of the loaded recording medium;

a registration controller for accepting skipped section information including a start point and a termination point of a section to be reproduced skippingly and for associating the skipped section information with the diskriminated contents;

a point table for storing a plurality of the skipped section information associated with the respective contents; and a reproduction controller for reading out at least one of the skipped section information stored in the point table in accordance with the diskriminated contents, and for skippingly reproducing the contents in accordance with the read out skipped section information.

Even in the case of contents without a prerecorded control level, sections to be subjected to skip reproduction are be registered beforehand according to the invention, whereby the skip reproduction can be done automatically over the sections.

Preferably, the discriminator diskriminates the contents of the loaded recording medium based on diskrimination information recorded on the loaded recording medium.

Since the disk is identified according to the identifying data recorded on the disk of the second invention, the processing burden can be decreased.

According to the present invention, there is also provided a method for skippingly reproducing contents recorded on a recording medium exchangeably loaded in an reproduction apparatus, comprising the steps of:

diskriminating the contents of the loaded recording medium;

accepting skipped section information including a start point and a termination point of a section to be reproduced skippingly;

registering the accepted skipped section information in a point table while associating with the diskriminated contents;

reading out the skipped section information registered in the point table in accordance with the diskriminated contents; and skippingly reproducing the contents in accordance with the read out skipped section information.

Preferably, a plurality of the skipped section information associated with the respective contents are registered in the point table. Then at least one of the skipped section information is selected in accordance with the diskriminated contents to be skippingly reproduced.

Preferably, the contents of the loaded recording medium is diskriminated based on diskrimination information recorded on the loaded recording medium.

DETAILED DESCRIPTION OF THE PREFERRED EMBODIMENTS

Figure 1:
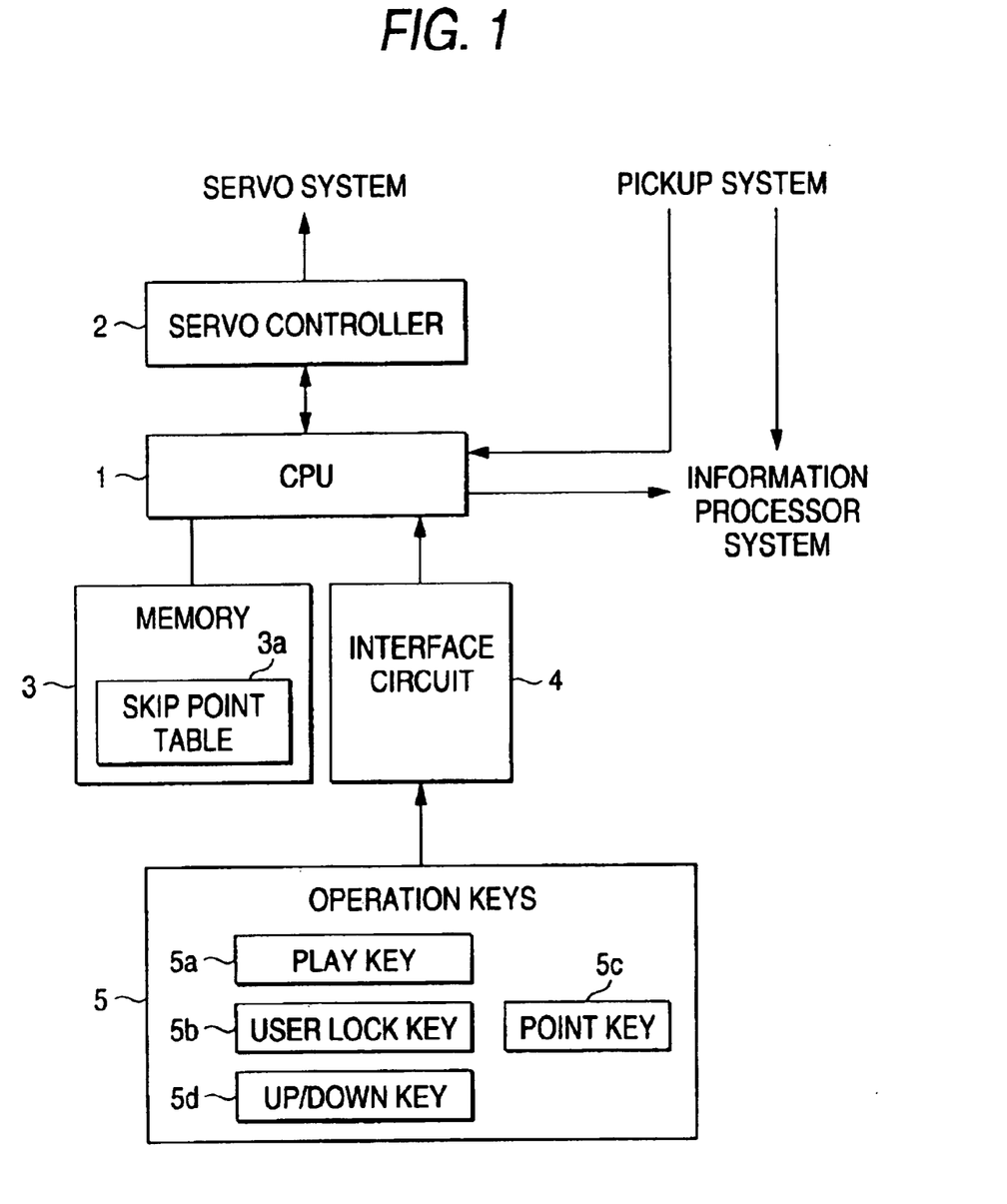
FIG. 1 is a block diagram showing a schematic configuration of a recording medium reproduction apparatus according to one embodiment of the invention.

FIG. 1 is a block diagram of a recording medium reproduction apparatus illustrating a signal processing system of a DVD player according to the invention. Reference numeral 1 denotes CPU and to the CPU 1, a servo controller 2 for driving and controlling a servo system including a spindle motor, a feed motor and so on, a memory 3 for dealing with the registration of control sections to be subjected to skip reproduction, and an interface circuit 4 for operating the registration of control sections are connected.

Further, the CPU 1 is fed with data (hereinafter called "disk data") for use in identifying a disk; the disk data, for example, BCA data, the total reproduction time and the like are read out by a pickup system.

In addition, the CPU 1 supplies control parameters for designating dubbed audio and subtitles to be reproduced to the signal processing system for streams of processing audio, subpicture and MPEG (Moving Picture Experts Group) video.

The memory 3 is provided with a skip point table 3a for storing the starting and termination points of sections to be subjected to skip reproduction corresponding a plurality of contents.

Figure 8:
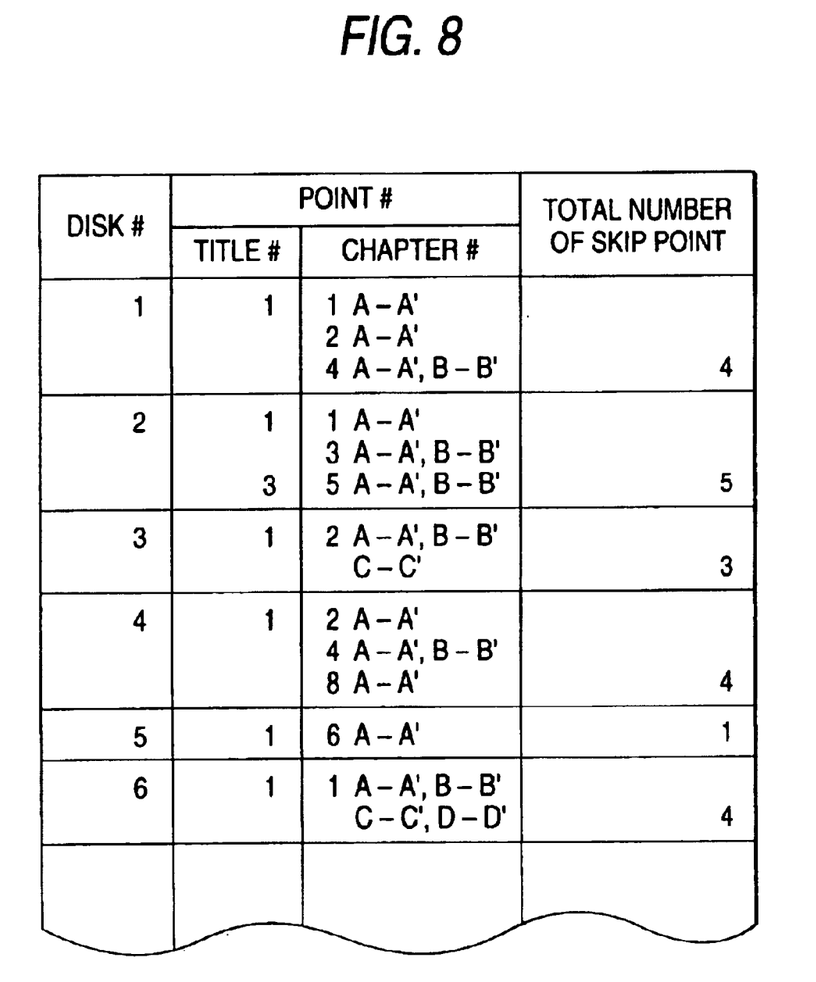
FIG. 8 is a table showing one example of a skip point table.

FIG. 8 shows an example of the skip point table. More specifically, the skip point table is used for storing DISK # as data for identifying disks on a content basis, POINT # indicative of the starting and termination points of predetermined sections to be subjected to skip reproductions, and the number of points indicative of the total number of sections to be subjected to skip reproductions, these corresponding to one another. The skip reproduction is automatically done according to the skip point table as described later.

The interface circuit 4 is connected to an operation button 5 and translates into a command the signal given by the operation key 5 and sends the command to the CPU 1.

The operation key 5 is constituted of a PLAY key 5a, a USER LOCK key 5b, a POINT key 5c and an UP/DOWN key 5d. The PLAY key 5a corresponds to the command to start the reproduction, the USER LOCK key 5b to register a section to be subjected to skip reproduction, the POINT key 5c to designate the starting and termination points of the section, and the UP/DOWN key 5d to edit the skip point table.

Figure 2:
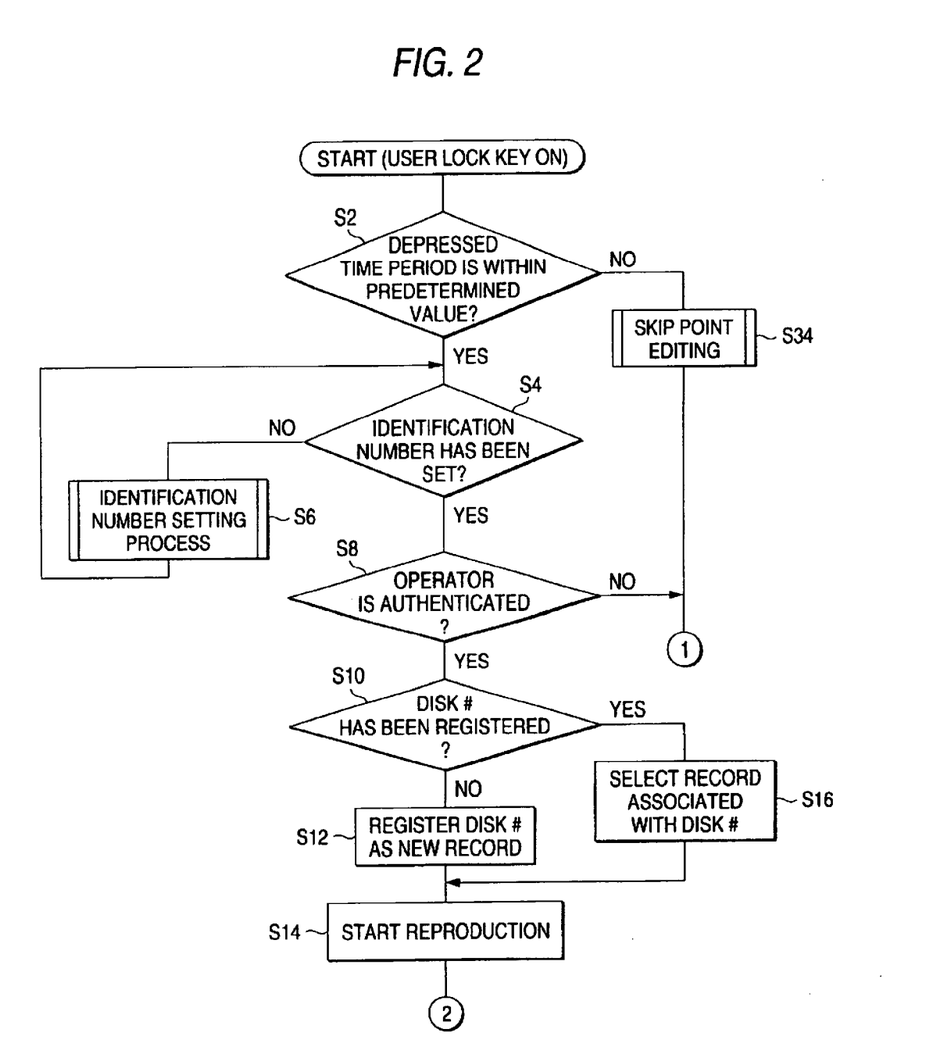
FIGS. 2 and 3 are flowcharts showing a procedure for registering a section to be skipped.
Figure 3:
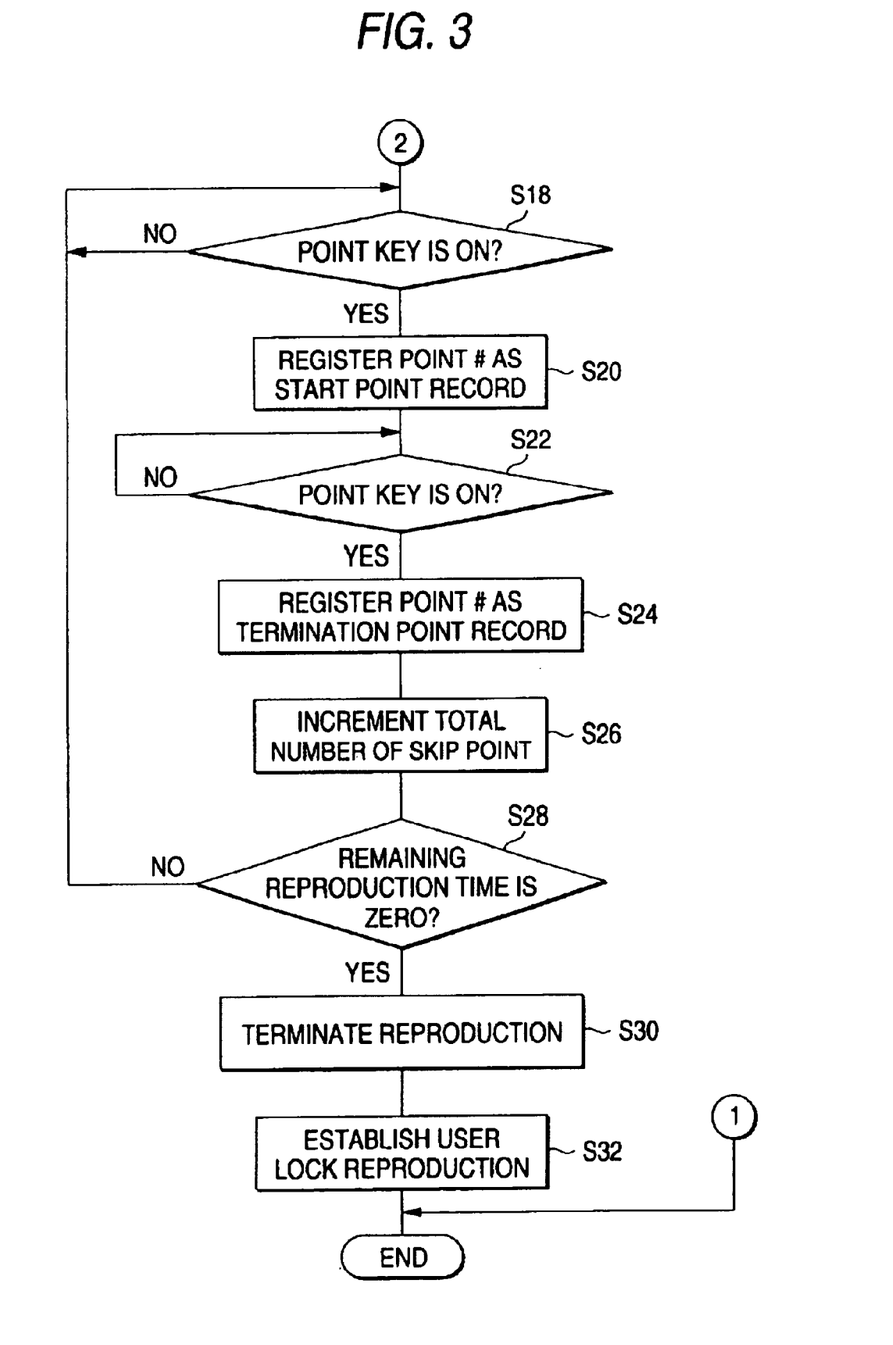

FIGS. 2 and 3 are flowcharts showing procedures for registering a user lock section to be skipped in the recording medium reproduction apparatus. A process is started by depressing the USER LOCK key 5b and it is checked whether or not depressed time period is within a predetermined range of time, for example, not longer than two seconds (Step S2). If the depressed time period is within the predetermined range of time, whether or not a personal identification number has been set is checked (Step S4). If the personal identification number has not been set up yet, a process for setting the personal identification number is performed (Step S6), which will be described later. Then Step S4 is followed again and steps after this are repeated.

If the set-up personal identification number is found at Step S4, personal identification number input is requested so as to authenticate an operator from the personal identification number input (Step S8). When the operator is authenticated, it is checked whether each disk is the one registered in the skip point table 3a according to the disk data on the disk loaded, for example, the BCA data and the total reproduction time (Step S1). If the disk is found unregistered, a new record is selected as an edited object and DISK # is registered (Step S12) in order to start playing this disk (Step S14.

If the disk is found registered in the skip point table 3a at Step S10, a record corresponding to the DISK # identified as an edited object is selected (Step S16) in order to start playing the disk (Step S14).

During the playing of the disk, whether or not the POINT key 5c has been depressed is checked (Step S18). If the POINT key 5c has not been depressed yet, this action is repeated. When the POINT key 5c is depressed, a POINT # of the start point is registered in the record as the edited object (Step S20).

Whether or not the POINT key 5c has been depressed thereafter is checked (Step S22), and if it has not been depressed yet, this action is repeated. When the POINT key 5c is depressed, a POINT # of the termination point is registered in the record as the edited object (Step S24). Then the total number of the skip point is incremented and the result is registered in the record (Step S26).

Further, whether or not the remaining reproduction time comes up to zero is checked (Step S28), and if it is not zero, Step S18 is followed again and steps after this are repeated. If the remaining reproduction time is found to be zero at Step S28, the reproduction is terminated (Step S30) and a user lock function is used to set the reproduction operation (Step S32) before the process is terminated.

If it is determined that the depressed time period of the USER LOCK key 5b has exceeded the predetermined time at Step S3, a skip point editing, which will be described later, is performed and the process is terminated then.

Figure 4:
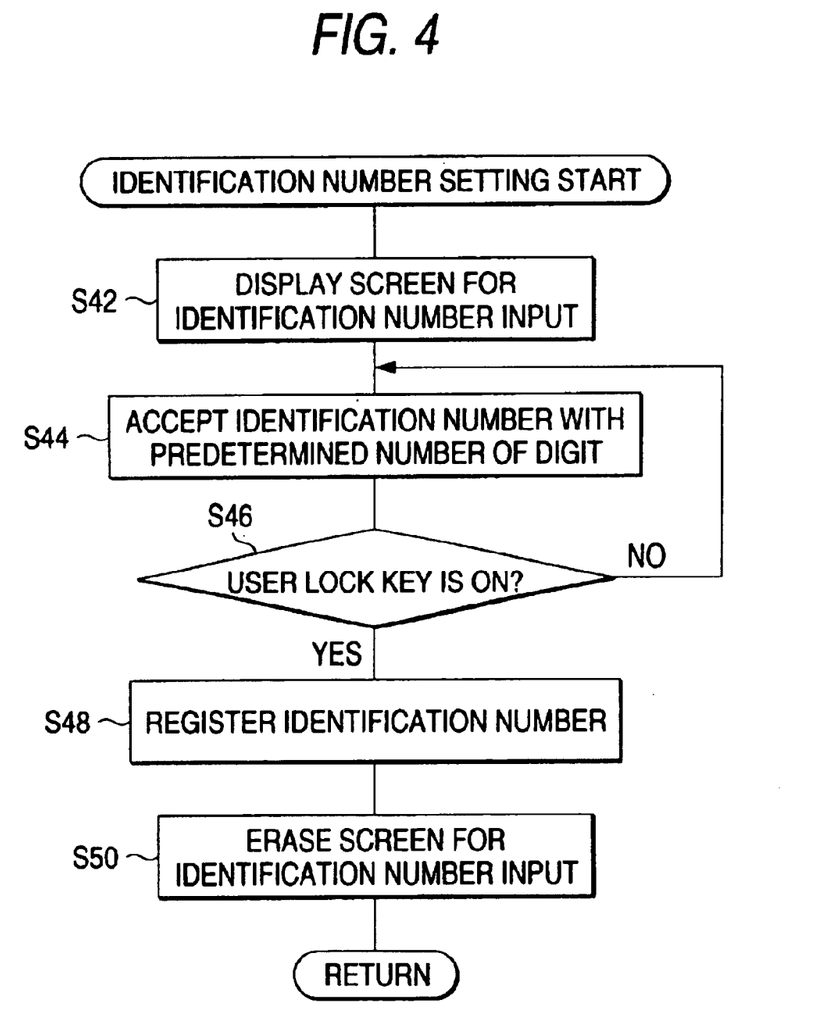
FIG. 4 is a flowchart showing a procedure for setting a personal identification number.

FIG. 4 is a flowchart showing a procedure for setting personal identification number to the recording medium reproduction apparatus. A personal identification number input screen is displayed (Step S42) and then personal identification number input with a predetermined number of digits is accepted (Step S44). Whether or not the USER LOCK key 5b has been depressed is checked (Step S46) and if it has not been depressed yet, Step S44 is followed again and steps after this are repeated.

If it is determined that the USER LOCK key 5b has been depressed at Step S46, the personal identification number is registered (Step S48) and the process is terminated after the personal identification number input screen is erased (Step S50).

Figure 5:
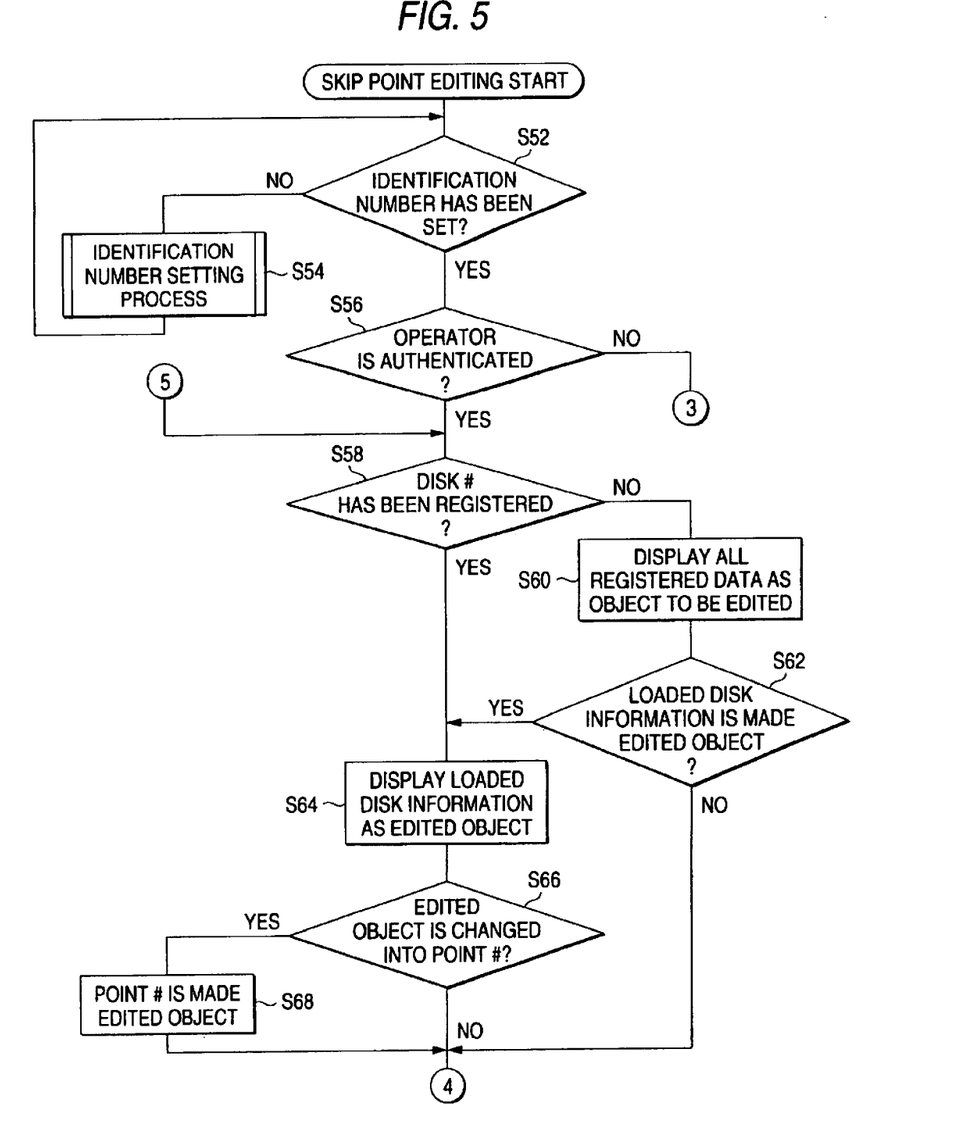
FIGS. 5 and 6 are flowcharts showing a procedure for performing a skip point editing.
Figure 6:
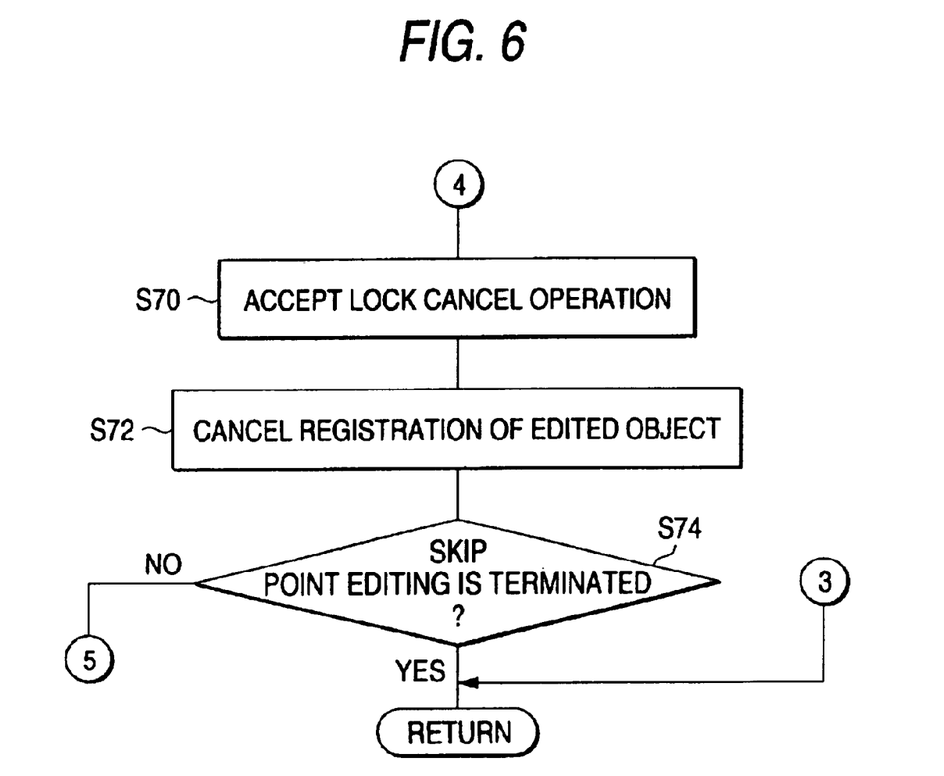

FIGS. 5 and 6 are flowcharts showing procedures for performing a skip point editing in the recording medium reproduction apparatus. A process is started by checking whether or not the personal identification number has been set (Step S52). If the personal identification number has not been set yet, the aforementioned process of setting the personal identification number is performed (Step S54) and then Step S52 is followed again and steps after this are repeated.

If the set-up personal identification number is found at Step S52, personal identification number input is requested so as to authenticate an operator from the personal identification number input (Step S56). When the operator is authenticated, it is checked whether each disk is the one registered in the skip point table 3a according to the disk data on the disk loaded, for example, the BCA data and the total reproduction time (Step S58). If the disk is found unregistered, the whole registered data is displayed on the screen as an object to be edited (Step S60). Then it is checked whether disk information of the loaded disk has been made the edited object (Step S62). When such a change is made, the disk information is displayed on the screen as the edited object (Step S64). If the disk is otherwise found registered in the skip point table 3a at Step S58, Step S64 is followed and steps after this are repeated.

Further, it is checked whether the edited object has been made the POINT # (Step S66) and when such a change is made, the POINT # is regarded as an edited object (Step S68). If the disk information of the loaded disk has not been made the edited object at Step S62, or if the POINT # has not been made the edited object at Step S66, or if lock cancel operation is accepted after processing at Step S68, the registration of the edited object is canceled (Step S72). It is checked whether the termination of the skip point editing has been instructed and if it has not been so instructed, Step S58 is followed again and steps after this are repeated. If it is determined that the termination of the skip point editing has been instructed at Step S74, the whole process is terminated. Moreover, the whole process is also terminated when the operator is not authenticated Step S56.

Figure 7:
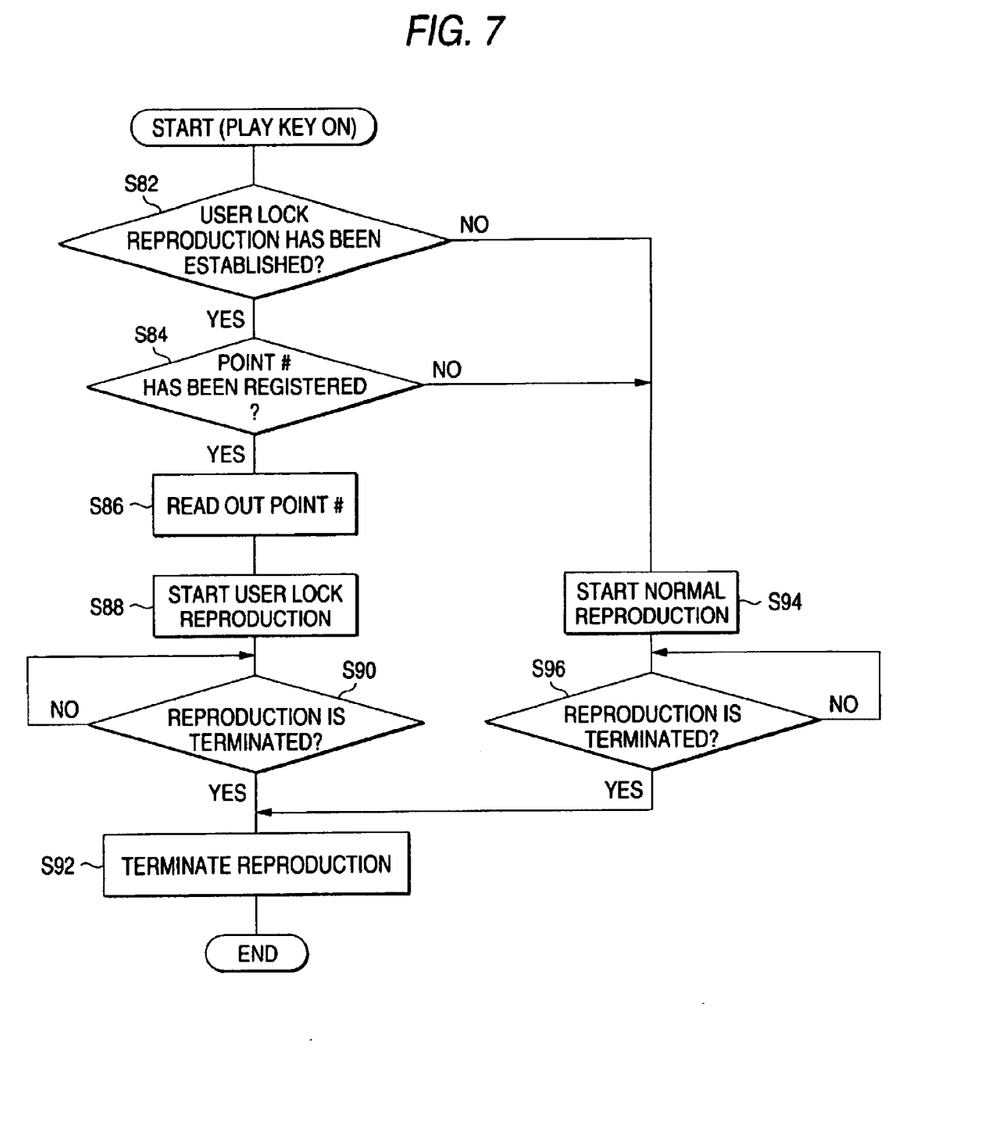
FIG. 7 is a flowchart showing a procedure for performing a skip reproduction.

FIG. 7 is a flowchart showing procedure for performing the skip reproduction in the recording medium reproduction apparatus.

It is checked whether or not a reproduction using the user lock function has been set (Step S82) and if it has been set, it is checked whether each disk is the one registered in the skip point table 3a according to the disk data on the disk loaded, for example, the BCA data and the total reproduction time (Step S84). If the disk is otherwise found registered, POINT # is read out and set in the work area of the memory 3 (Step S86). The reproduction is also started by using the user lock function (Step S88). In other words, the skip reproduction is carried out when a reproduction point approaches the section defined by the POINT #.

It is checked whether or not the remaining reproduction time is zero (Step S90) and if it is not zero, this action is repeated. If the remaining time is found zero at Step S90, the reproduction operation is terminated (Step S92) and so is the whole process.

If the use of the user lock function is found unset for the reproduction purpose at Step S82 or if the disk is found unregistered in the skip point table 3a at Step S84, the normal reproduction operation is started (Step S94). Further, it is checked whether or not the remaining time is zero (Step S96) and if it is not zero, this action is repeated. If the remaining time is found zero at Step S90, the reproduction operation is terminated (Step S92) and so is the whole process.

As has been described heretofore, according to the present invention, since the skip reproduction is done according to the starting and termination points of the sections prerecorded in the skip point table, superior effects are achievable thereby in that skip reproduction can be done over the predetermined sections of the contents without the prerecorded control level.

Moreover, since the contents of the recording medium is identified according to the identifying data recorded on the recording medium, superior effects are also achievable thereby in that the processing burden can be lightened.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. An apparatus for reproducing contents recorded in a predetermined order on a recording medium loaded exchangeably therein and for reproducing contents of the same loaded recording medium skippingly regardless the predetermined order, the apparatus comprising:

a discriminator for discriminating the contents of the loaded recording medium;

a registration controller for accepting skipped section information including a start point and a termination point of a section to be reproduced skippingly and for associating the skipped section information with the discriminated contents;

a point table for storing a plurality of the skipped section information associated with the respective contents; and a reproduction controller for reading out at least one of the skipped section information stored in the point table in accordance with the discriminated contents, and for skippingly reproducing the contents in accordance with the read out skipped section information.

2. The reproduction apparatus as set forth in claim 1, wherein the discriminator discriminates the contents of the loaded recording medium based on discrimination information recorded on the loaded recording medium.

3. The reproduction apparatus as set forth in claim 1, wherein the point table stored the DISK number, TITLE number, CHAPTER number, and a total number of skipped sections.

4. A method for skippingly reproducing contents recorded on a recording medium loaded exchangeably in an reproduction apparatus, comprising the steps of:

discriminating the contents of the loaded recording medium;

accepting skipped section information including a start point and a termination point of a section to be reproduced skippingly;

registering the accepted skipped section information in a point table while associating with the discriminated contents;

reading out the skipped section information registered in the point table in accordance with the discriminated contents; and skippingly reproducing the contents in accordance with the read out skipped section information.

5. The reproduction method as set forth in claim 4, wherein a plurality of the skipped section information associated with the respective contents are registered in the point table; and wherein at least one of the skipped section information is selected in accordance with the discriminated contents to be skippingly reproduced.

6. The reproduction method as set forth in claim 4, wherein the contents of the loaded recording medium is discriminated based on discrimination information recorded on the loaded recording medium.

7. The reproduction method as set forth in claim 4, wherein the point table stored the DISK number, TITLE number, CHAPTER number, and a total number of skipped sections.

* * * * *